Oct. 2, 1956    R. D. GAMBRILL    2,765,441
APPARATUS FOR MONITORING AND EXTRUDING PLASTIC MATERIALS
Filed Sept. 3, 1953    2 Sheets-Sheet 1
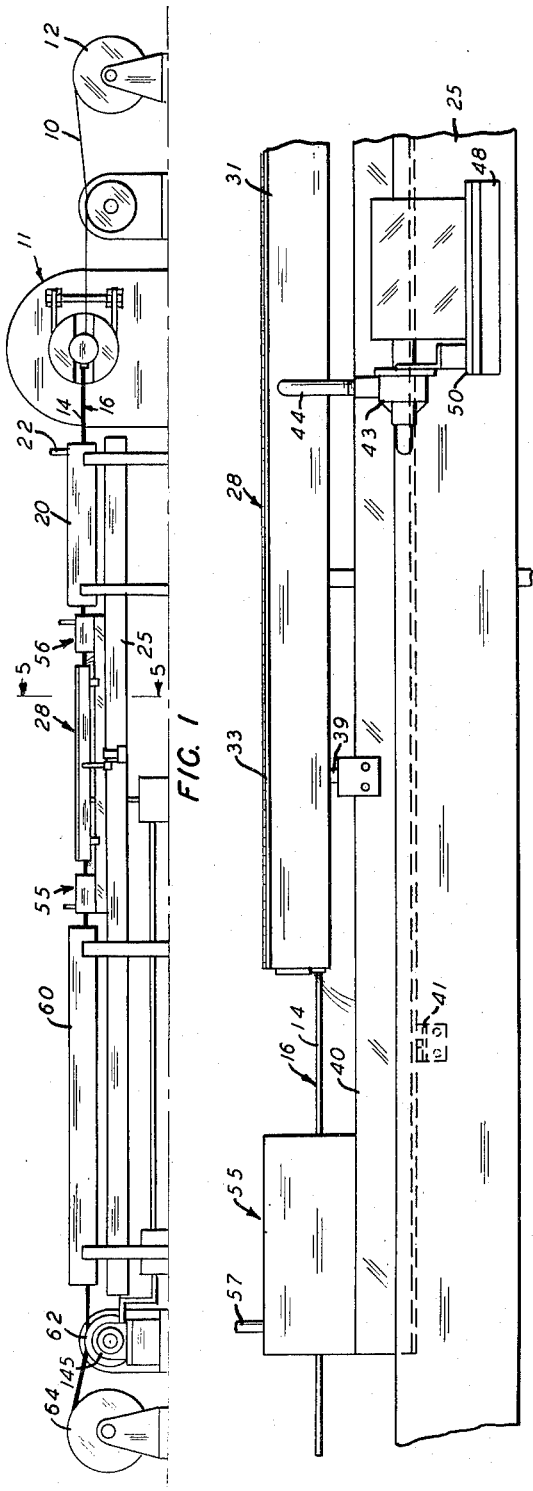
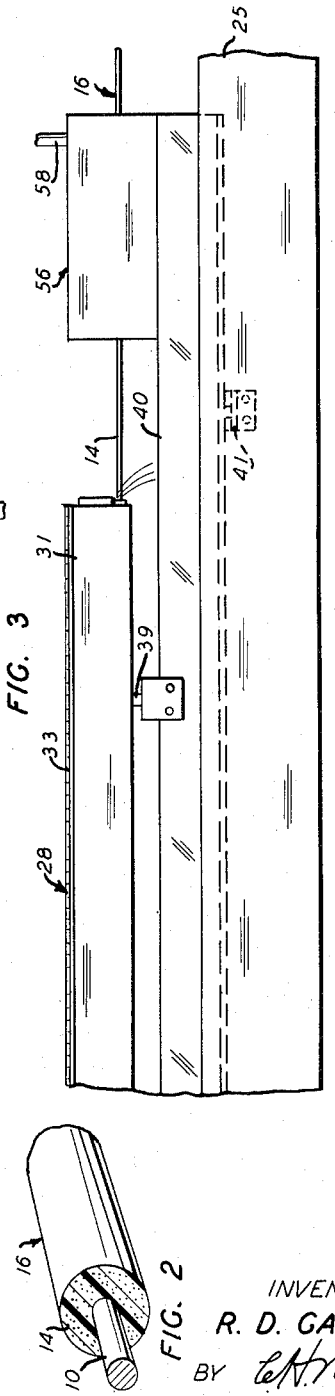
INVENTOR
R. D. GAMBRILL
BY
ATTORNEY Oct. 2, 1956  R. D. GAMBRILL  2,765,441
APPARATUS FOR MONITORING AND EXTRUDING PLASTIC MATERIALS
Filed Sept. 3, 1953  2 Sheets-Sheet 2

INVENTOR
R. D. GAMBRILL
BY [signature]
ATTORNEY

United States Patent Office 2,765,441
Patented Oct. 2, 1956

2,765,441

APPARATUS FOR MONITORING AND EXTRUDING PLASTIC MATERIALS

Richard D. Gambrill, Idlewylde, Md., assignor to Western Electric Company, Incorporated, New York, N. Y., a corporation of New York Application September 3, 1953, Serial No. 378,243

7 Claims. (Cl. 324—61)

This invention relates to apparatus for extruding plastic materials, and more particularly to apparatus for continuously controlling the capacitance of an insulated wire produced by extruding a layer of plastic insulation upon a continuously advancing wire.

Manifestly, the speech sounds received by a telephone must possess sufficient intelligibility to be easily understood. In any telephone circuit it is essential that the noise-to-signal ratio be reduced to a practical minimum. In telephone cables containing a multiplicity of pairs of individually insulated wires, the capacitance unbalance to ground, or difference in direct capacitances of the wires of a pair to ground, is an indication of the susceptibility of cable circuits to noise and interference. It is important that the two wires of a pair in a cable possess substantially equal capacitance with respect to the surrounding pairs of the cable and the metallic cable sheath.

In the past insulated wires have been manufactured by extruding coverings of solid thermoplastic materials around conductors. Attempts have been made to keep the capacitance to ground of such insulated conductors at a predetermined value by maintaining the diameter of the insulation within close limits. However, this procedure has not been entirely satisfactory because the dielectric constant of the plastic insulation itself may vary due to variations in its composition or other causes. Also, it is possible to produce insulation having a substantially constant diameter without maintaining the capacitance to ground within the desired limits, because the insulating covering may be eccentric with respect to the wire which it surrounds.

Recently attempts have been made to insulate conductors with expanded plastics, one of the most promising of which is expanded polyethylene. In the manufacture of such insulation, the problem of maintaining a predetermined uniform capacitance to ground of an insulated wire is further complicated by random variations in the composite dielectric constant of the extruded insulation which occur during the extrusion process. These variations may result from changes in the degree of expansion of the cellular plastic insulation, which is difficult to control because of changes in the temperatures, pressures and other factors in the extrusion process.

One method of manufacturing cellular polyethylene insulated conductor comprises the continuous extrusion of polyethylene containing a chemical blowing agent onto a continuously advancing wire passing through an extrusion die in an extruder. In the head of the extruder such a temperature is maintained as to facilitate continuous and smooth extrusion of the polyethylene and to insure the formation of gas by decomposition of the blowing agent. The extruded layer of insulation increases in size immediately after leaving the extrusion die due to the expansion of the gases formed as a result of the decomposition of the blowing agent, and minute, distributed, discrete, gas-filled cells are formed throughout the polyethylene sheath. Shortly after the insulated wire leaves the extrusion die, the extruded sheath is cooled by immersing the insulated wire in a bath of cool water.

In order to prevent premature expansion of the gases formed by decomposition of the blowing agent and to insure as complete mingling as possible of these gases and the polyethylene within the confines of the extruder, it is important that the temperatures be regulated closely and that the rate of extrusion and the linear speed of the wire be adjusted to maintain adequate pressure conditions within the extruder head.

In spite of all precautions which may be taken, the gas content of the cellular polyethylene insulation fluctuates somewhat during the extrusion process, even under the most ideal conditions. These fluctuations in the degree of expansion of the insulation cause corresponding changes in the composite dielectric constant of the insulation. Another factor which causes random variations in the dielectric constant of the insulation is non-uniformity in the distribution of gas cells throughout a cross section of the insulated wire.

However, it has been found that by proper process control the variations in the composite dielectric constant of the insulation may be held within a limited range. Further, it has been found that by varying the outer diameter of the insulation on the wire it is possible to compensate for changes in the dielectric constant so as to maintain a predetermined capacitance to ground. Hence, there is need for extruding apparatus capable of sensing variations in the dielectric constant of the insulated wire and controlling the production of the insulated wire in such a manner as to obtain the desired capacitance characteristics.

It is an object of this invention to provide new and improved apparatus for extruding plastic materials.

Another object of this invention is to provide new and improved apparatus for continuously controlling the capacitance of an insulated wire produced by extruding a layer of plastic insulation upon a continuously advancing wire.

Apparatus embodying certain features of the invention may include a container, made at least in part of an electrically conductive material, through which an insulated wire may be passed, means for maintaining within the container a body of an electroconductive liquid, such that the insulated wire within the container is immersed completely in the liquid, means for isolating the liquid and the container electrically from all other conductors, means for applying an alternating electrical potential between the wire and the sheath of conductive liquid surrounding the submerged wire whereby there is formed an electrical condenser in which the dielectric is the insulation on the wire, and means for measuring the capacitance of the condenser.

A complete understanding of the invention may be had from the following detailed description of apparatus forming a specific embodiment thereof, when taken in conjunction with the appended drawings, in which:

Fig. 1 is a side elevation of the apparatus with parts thereof broken away;

Fig. 2 is an enlarged, fragmentary, perspective view of a cellular plastic insulated wire with parts thereof broken away for clarity;

Fig. 3 is an enlarged, fragmentary, side elevation of an electrode forming part of the apparatus shown in Fig. 1;

Fig. 4 is an enlarged, fragmentary, side elevation of a continuation of the electrode shown in Fig. 3;

Figure 5:
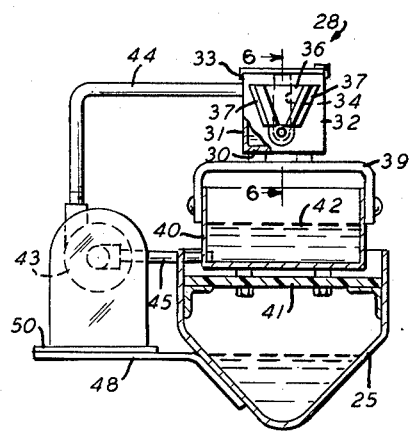
Fig. 5 is an enlarged, fragmentary, vertical section taken along line 5—5 of Fig. 1.

Referring now to Fig. 1, there is shown an apparatus for manufacturing plastic insulated wire. A bare wire 10 is continuously advanced through a conventional plastics extruder 11 from a supply reel 12. In the plastics extruder 11, the bare wire 10 is enveloped with a substantially concentric layer 14 of a plastic insulating material, such as solid or expanded polyethylene or the like, to form an insulated wire 16.

Immediately after the insulated wire 16 emerges from the die of the plastic extruder 11, it is immersed in a bath of cooling water (not shown) contained in a cooling trough 20. The level of the water in the cooling trough 20 is maintained substantially constant, at a height sufficient to insure that the insulated wire 16 remains completely immersed in the water during its transit along the trough, by a continuous flow of water from a water supply inlet 22. The water from the cooling trough 20 flows continuously from the ends of the cooling trough into an elongated overflow trough 25 mounted below the cooling trough.

Positioned adjacent to the left end of the cooling trough 20 (as viewed in Fig. 1) and in longitudinal axial alignment therewith is an elongated, hollow, box-like electrode 28 forming part of a capacitance sensing unit. The electrode 28 includes a bottom 30 (Figs. 5 and 6), sides 31—31 and ends 32—32, which are rectangular in shape and formed from sheet metal, such as brass, copper or the like. A cover 33, made similarly from sheet metal, is hinged to one of the sides 31—31.

The ends 32—32 of the electrode 28 are provided with U-shaped openings, one of which is shown at 34 in Fig. 5. The openings 34—34 are aligned axially in the path of the continuouslffy advancing insulated wire 16, so as to permit the wire to pass longitudinally through the electrode 28, and are provided with removable gates, one of which is shown at 36 in Fig. 4, mounted slidably between guide members 37—37. The gates 36—36 are normally positioned so as to cover a greater part of the openings 34—34, but leaving portions uncovered to provide access for the insulated wire. U-shaped liners, one of which is shown at 38 in Fig. 6, made of anti-friction material, such as "Teflon" or the like, are fitted over the edges of the openings 34—34 for the purpose of reducing the frictional drag on the moving insulated wire and preventing injury to the insulating layer by the sharp metal edges of the openings.

The electrode 28 is mounted on a pair of U-shaped supports 39—39, which are in turn mounted transversely between the sides of an elongated, rectangular collector pan 40 spacedly positioned beneath the electrode 28. The collector pan 40 is somewhat greater in length than the electrode 28 and extends longitudinally beyond the ends of the electrode. The collector pan 40 is mounted between the sides of the overflow trough 25 on a plurality of insulating cross members 41—41 (Figs. 3, 4 and 5) made of a suitable insulating material, such as phenol fibre, or the like, which electrically isolate the electrode 28 and collector pan 40 from other conductive parts of the apparatus, such as the overflow trough 25 and the water contained therein.

Figure 6:
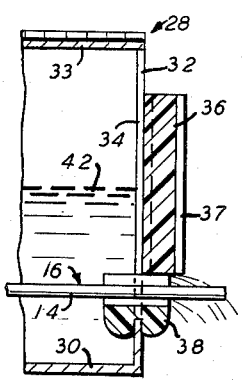
Fig. 6 is an enlarged, fragmentary, vertical section taken along line 6—6 of Fig. 5.
Figure 7:
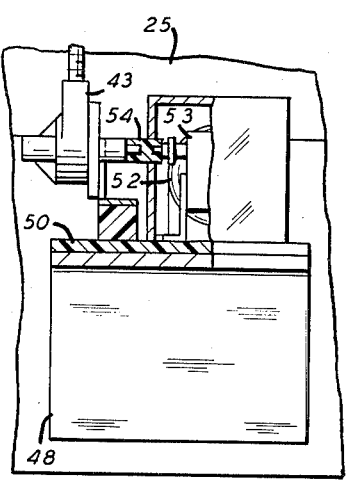
Fig. 7 is an enlarged, fragmentary view of a pumping arrangement shown in Fig. 3 with parts thereof broken away.

The electrode 28 is designed to contain a body of a suitable electroconductive liquid, such as water, indicated at 42 in Figs. 5 and 6, which is electrically isolated from all extraneous conductors. For the purpose of this invention, ordinary tap water has been found to be sufficiently electroconductive. The water 42 is maintained at a substantially constant level within the electrode 28 by means of a continuously operated centrifugal pump 43 (Fig. 7), which supplies the water to the interior of the electrode through an inlet pipe 44. An intake pipe 45 of the pump 43 is connected to the collector pan 40 which catches the continuous overflow of water 42 that escapes from the openings 34—34 at the ends of the electrode 28. The pump 43 operates at a rate sufficient to maintain the level of the water 42, such that the insulated wire 16 passing through the electrode 28 remains completely immersed in the water throughout the entire length of the electrode.

In order to insure the electrical isolation of the water 42, the pump 43 is mounted on a laterally extending bracket 48 (Fig. 5) attached to the overflow trough 25 with a layer 50 of a suitable insulating material, such as phenol fibre, interposed between the bracket and the base of the pump. The motive power for operating the pump 43 is supplied by a constant speed electric motor 52 through a gear box 53, which drives the pump through a shaft coupling 54 made of a suitable insulating material, such as phenol fibre or the like.

Mounted on opposite ends of the collector pan 40 are a pair of conventional air wipers 55 and 56 designed to remove any liquid film adhering to the surface of the insulated wire either before it enters the electrode or after it emerges therefrom. Compressed air is supplied to the air wipers 55 and 56 through pneumatic supply lines 57 and 58, respectively, which are made from insulating material, such as tubular polyethylene or the like.

Positioned adjacent to the air wiper 55 at the left end of the collector pan 40 is a second cooling trough 60 similar to the trough 20. The trough 60 is supplied with cold water and the insulated wire 16 as it passes through the water is further cooled. From the trough 60, the insulated wire 16 advances around a takeup capstan 62 and thence to a takeup reel 64.

The water 42 contained within the electrode 28 serves as a conductive cylindrical sheath in contact with successive increments of the insulated wire 16, each of which increments is of a predetermined, identical length. In conjunction with the centrally disposed wire, the sheath of electrically conductive water 42 forms a coaxial capacitor in which the insulating layer 14 is the intervening dielectric.

This capacitor is inserted into the "unknown" bridge arm BC of a four terminal capacitance bridge circuit, indicated generally at 70 (Fig. 8), the terminals of which are designated A, B, C and D, respectively. The electrode 28 is connected to the terminal B through a shielded lead 72, and the bare wire 10 is connected by a suitable connection (not shown) to the terminal C, which is grounded. The bridge arms AB and AD comprise standard resistances 73 and 74, respectively, of equal value. The bridge arm CD comprises an adjustable standard capacitor 76, which may be adjusted to a desired value of capacitance $C_s$ for comparison with the capacity of $C_x$ of the "unknown" bridge arm BC.

The bridge circuit 70 (Fig. 8) is energized by means of a low frequency oscillator 78, which applies an alternating potential of approximately 10 kilocycles across the terminals A and C. The terminals B and D of the bridge circuit 70 are interconnected through the primary winding 79 of a bridge transformer 80. One terminal of the secondary winding 82 of the bridge transformer 80 is grounded at 84 and the other terminal connected to a control grid 85 of a conventional duo-triode 87, such as a 6J6 duo-triode.

A cathode 90 of the duo-triode 87 is grounded through a suitable resistance 91, and is heated indirectly in a conventional fashion by a heating filament (not shown). A second control grid 92 is connected through a suitable variable resistance 93 and a capacitor 95 to the ungrounded output terminal of the oscillator 78. Plates 97 and 98 of the duo-triode 87 are connected together at a common junction 99, and are connected through a suitable load resistance 100 to the positive output terminal 102 of a unidirectional power supply 104 of approximately 400 volts. The power supply 104 consists of a full wave electronic rectifier, including a conventional duo-diode 105, such as 6X5 duo-diode, and a transformer 107 having a center-tapped secondary winding 108 and a primary winding 110 supplied by a constant voltage transformer 112. The center tap of the secondary winding is grounded at 113.

The plates 97 and 98 of the duo-triode 87 are connected through a coupling capacitor 115 to a resistance 117, which is grounded at 118. Connected across the resistance 117 is a germanium rectifier 119 in series with a control resistor 120 and a portion of a potentiometer resistance winding 121 through a sliding contact 122. A rectifying section, shown generally at 123, including a grounded resistance 125 and a capacitance 126, is provided. The sliding contact 122 is connected through the remaining portion of the resistance winding 121 to the positive terminal 102 of the power supply 104.

Figure 8:
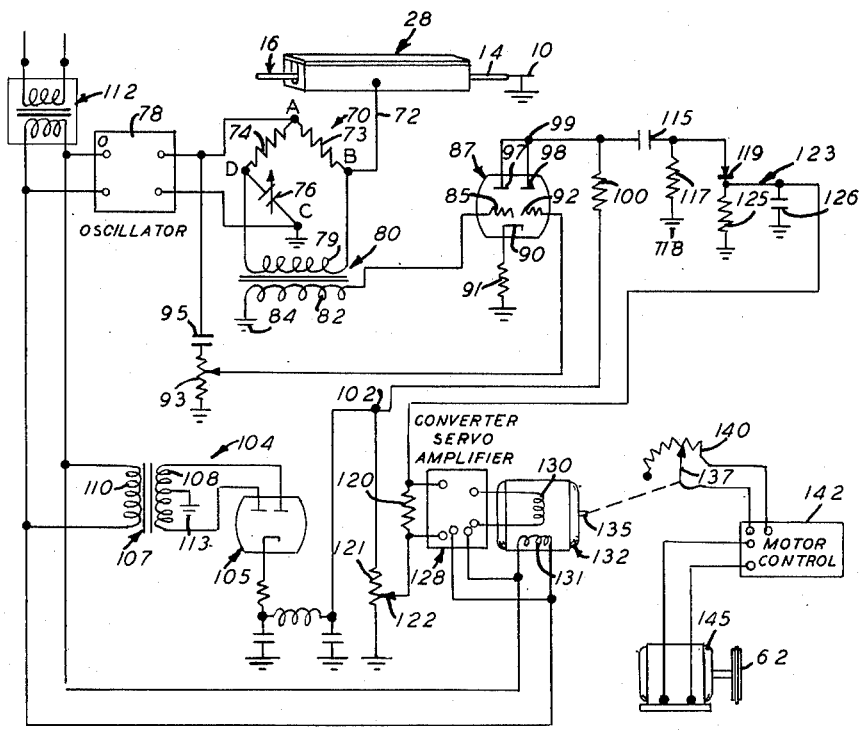
Fig. 8 is a schematic diagram of an electric circuit forming part of the apparatus.

The voltage drop across the control resistor 120 is impressed across the input terminals of a conventional converter and servo-amplifier unit, designated schematically at 128 in Fig. 8. A suitable commercial unit 128 is a No. R-820-1 converter and servo-amplifier manufactured by Leeds and Northrup, Philadelphia, Pa. The output terminals of the converter and servo-amplifier unit 128 are in turn connected across a winding 130 of a two-phase, two-winding, induction-type balancing motor 132. A second winding 131 of the balancing motor 132 is energized continuously by a connection across the secondary of the constant voltage transformer 112.

An output shaft 135 of the motor 132 is operatively connected to a sliding contact 137 of a variable resistor 140 forming part of a conventional variable speed motor control unit, designated schematically at 142. The motor control unit 142 determines the speed of a drive motor 145 operatively connected for driving the takeup capstan 62 at a speed in accordance with the position of the sliding contact 137 of the resistor 140.

*Operation*

During an extruding operation, the bare wire 10 is advanced continuously through the extruder 11 by the takeup capstan 62. In the extruder, the layer 14 of plastic insulation, which preferably is expanded polyethylene, envelopes the wire 10 in the throat of the extruder die orifice to form the insulated wire 16. The insulated wire 16 emerges from the extruder 11 and is immediately immersed in the bath 19 of cooling water contained in the trough 20. As the insulated wire advances through the water bath 19, the plastic insulation is cooled to prevent further appreciable changes in the dielectric constant or outer diameter thereof.

After the insulated wire 16 emerges from the water bath 19 in the trough 20 it passes through the air wiper 56, which removes any water or foreign matter adhering to the periphery of the insulation. From the air wiper 56 the insulated wire 16 advances into the electrode 28 through the opening 34 in the right end thereof, as viewed in Fig. 1. Within the electrode 28, the insulated wire 16 is completely immersed in the water 42 contained therein.

The water 42 forms a conductive cylindrical sheath about the periphery of successive increments of the insulated wire, each of a predetermined length. By means of the connection through the shielded lead 72 to the bridge circuit 70 which is energized by the oscillator 78, an alternating electric potential is impressed between the grounded wire and the water 42 contained in the electrode 28, which in effect form two plates of a coaxial capacitor with the interposed insulating layer 14 serving as the dielectric.

As shown in the electrical diagram (Fig. 8), the capacity $C_x$ of this capacitor formed by the grounded wire and the sheath of water 42 is continuously compared with the capacity of the standard capacitor 76. The capacity of the standard capacitor 76 is set at a preselected value $C_s$, which balances the bridge circuit for a desired unit length capacitance of the insulated wire. For example, let it be assumed that it is desired to maintain a capacitance of 50 mmf. per foot of the insulated wire. Assuming that the electrode is five feet in length, the standard capacitor would have a value of 250 mmf.

In operation, so long as the unit length capacitance of the insulated wire is 50 mmf. per foot, the bridge circuit remains balanced and the balancing motor 132 remains inoperative, thus maintaining constant the speed setting of the motor 145 driving the capstan 62.

However, if the unit length capacitance of the insulated wire should decrease, due to a decrease in the dielectric constant of the plastic insulation or an increase in the outer diameter thereof, a difference in potential $V_{BD}$ appears across the terminals B and D, which is proportional to the degree of unbalance of the bridge circuit 70 and is 180° out of phase with the potential $V_{AC}$ between terminals A and C. This unbalance signal voltage $V_{BD}$ between terminal B and D impresses a potential proportional thereto and in phase with the potential across terminals A and C between the control grid 85 and the cathode 90 of the duo-triode 87.

Between the control grid 92 and the cathode 90, there is impressed a potential proportional to and in phase with the output potential of the oscillator 78. The plates 97 and 98 are constantly maintained positive with respect to the cathode by the power supply 104. Consequently, the plate current through the duo-triode is determined by the joint effect of the control grids 85 and 92, and is proportional to the algebraic sum of the voltages impressed upon the cathode and control grids 85 and 92, respectively.

The magnitude of the voltage applied to the control grid 92 is adjusted and maintained at a value such that it is substantially greater than the expected magnitude of any unbalance signal impressed upon the grid 85 during normal operation. Thus, the effect of the voltage applied to the grid 92 in effect produces a component of the plate current through the duo-triode 87 which is of the same frequency as the unbalance signal voltage $V_{BD}$ and functions as a reference. The unbalance signal voltage, in effect, either increases or decreases the amplitude of the plate current through the duo-triode 87, depending upon the direction of the unbalance, that is, whether the measured capacitance $C_x$ is greater or less than the standard capacitance $C_s$.

The A. C. component of the plate current passes through the coupling capacitor 115 and is half-wave rectified by the diode 119. The output of the diode 119, after passing through the filter section 123, is a unidirectional current. The voltage produced by the latter current across the control resistor 120 is bucked by a D. C. bias voltage which appears across the portion of the resistance winding 121 lying between the terminal 102 of the D. C. power supply 104 and the sliding contact 122. This bias voltage is adjusted to a value such that the voltage across the control resistor 120 is substantially zero when the bridge circuit is balanced. Thus, the D. C. voltage across the control resistor 120 varies in polarity with the direction of unbalance of the impedance bridge 70, and varies in magnitude in proportion to the magnitude of the unbalance. The D. C. potential across the control resistor 120 is converted to an A. C. voltage by a converter (not shown) forming part of the unit 128. The latter voltage is amplified and energizes the winding 130 of the balancing motor 132.

The balancing motor 132 is a two-winding, induction-type motor, and will not turn unless alternating current flows in both its windings. The winding 131 is connected so that alternating current always flows in it, which current is kept in phase with the output voltage of the transformer 112. The current which flows in the winding 130, due to an unbalance condition of the bridge, is made to lag the current in the winding 131 by either 90° or 270°, depending upon the direction of the unbalance. Thus, the direction of movement of the shaft 135 depends solely upon the polarity of the voltage across the control resistor 120. The position of the sliding contact 135 determines the speed of the motor 145 driving the capstan 62, and thus the speed of the wire 10 advancing through the extruder 11.

It is well known that the outer diameter of the insulating layer applied to a wire advancing through an extruder varies with the linear speed of the wire. All other conditions remaining constant, a decrease in the wire speed results in an increase in the outer diameter of the insulating layer. Conversely, an increase in the wire speed results in a decrease in the outer diameter. The effect of the outer diameter of the insulation layer on the resultant unit length capacitance of an insulator wire may be seen readily from the relationship, as given by the equation:

$$C_x = \frac{K\epsilon}{\log \frac{D}{d}}$$

wherein:

$C_x$ = capacitance of a unit length of wire
$D$ = diameter over the insulation layer
$d$ = bare wire diameter
$\epsilon$ = composite dielectric constant of the plastic insulation
$K$ = constant, depending on units used, e. g. $K = 7.366$ if $C_x$ is in mmf. per foot Manifestly, decreasing the outer diameter by increasing the wire speed causes the unit length capacitance of the insulated wire to be increased. The unit length capacitance of the insulated wire also may vary with variations in the insulating material itself, e. g. changes in the amount of gas present in an expanded plastic insulation. Also changes in the temperature, plasticity or composition of the plastic material will affect the thickness and unit length capacitance of the insulation.

For the assumed unbalance condition, wherein the measured unit length capacitance $C_x$ of the insulated wire has decreased below the predetermined standard capacitance $C_s$ due to a decrease in the composite dielectric constant of the plastic insulation, a voltage would appear across the control resistor 120 of such a polarity that the setting of the sliding contact 137 would be moved to increase the speed of the motor driving the capstan to increase the wire speed. The increased wire speed results in a smaller outer diameter of the insulation layer with an accompanying increase in the unit length capacitance of the insulated wire to restore the balance of the bridge 70.

Thus, it is apparent that although the composite dielectric constant of the plastic insulation may vary, due to size variation or due to normal random variations in the degree of expansion of an expanded plastic or to non-uniform gas distribution throughout a cross section of the expanded plastic, the unit length capacitance of the insulated wire will be maintained substantially constant at the desired value of capacitance $C_s$ by the use of the above-described apparatus.

It will be understood that the heretofore described capacitance sensing apparatus and associated electrical circuit has utility apart from the control of a variable speed motor driving a takeup capstan. It is manifest that the balancing motor could be arranaged to control the speed of rotation of the extrusion screw in the extruder 11, and, therefore, to vary the rate of extrusion of the plastic insulation in accordance with the capacitance measurements. Likewise, it is also possible to have the balancing motor control the apparatus which in turn controls the temperatures in various parts of the extruder, or the relative positions of the sheath-forming elements in the extruder, to change the character and thickness of the insulation layer, in accordance with such measurements. It will be further understood that the degree of expansion of the plastic might be controlled by using the balancing motor to control apparatus injecting gas into the plastic to form an expanded plastic insulation.

Although water has been used as a specific example of a suitable electroconductive liquid, it is not intended that this invention be limited by this choice. Manifestly, various other suitable electroconductive liquids might be employed with satisfactory results.

What is claimed is:

1. In apparatus for continuously controlling the capacitance of an insulated wire, an improved capacitance sensing apparatus which comprises an elongated hollow container made at least in part of a conductive material, said container being provided at either end with a pair of aligned apertures which permit an insulated wire to pass continuously through the container, a pump for continuously supplying an electroconductive liquid to the interior of the container at a rate sufficient to maintain the insulated wire within the container completely immersed in the liquid, means for electrically isolating the liquid and the container from all other conductors, and means for continuously comparing the capacitance between the wire and the conductive sheath of liquid surrounding the insulation thereon with a known standard capacitance.

2. In apparatus for extruding plastic materials including means for controlling the capacitance of a plastic insulated wire, an improved capacitance sensing device which comprises an elongated metal tank provided with openings at either end thereof through which an insulated wire may be continuously advanced, an elongated reservoir positioned beneath the tank, said reservoir having a length somewhat greater than that of the tank so as to extend beyond the ends of the tank, a body of an electroconductive fluid contained within said reservoir, means for continuously transferring said liquid from the reservoir to the interior of the tank at a rate such that the insulated wire advancing through the tank is completely immersed in said liquid, means for electrically isolating the tank, the reservoir and the electroconductive liquid from all other conductors, means for applying an alternating potential between the wire and the conductive sheath of liquid surrounding the insulated wire, and means for continuously comparing the capacitance between the wire and said conductive sheath with a known standard capacity.

3. In apparatus for extruding plastic materials including means for controlling the capacitance of a plastic insulated wire, an improved capacitance sensing device which comprises an elongated metal tank provided with openings at either end thereof through which an insulated wire may be continuously advanced, an elongated pan positioned beneath the tank, an electroconductive liquid contained within the pan, said pan being designed to catch the liquid escaping from the tank through the openings therein, a pump for continuously circulating liquid from the pan to the interior of the tank at a rate such that the insulated wire advancing through the tank is completely immersed in the liquid, means for electrically isolating the electroductive liquid, and means for continuously measuring the capacitance between the wire and the conductive sheath of the liquid surrounding successive portions of the wire.

4. In apparatus for extruding plastic materials including means for controlling the capacitance of a plastic insulated wire, an improved capacitance sensing device which comprises an elongated metal tank provided with openings at either end thereof through which an insulated wire may be continuously advanced, an elongated pan positioned beneath the tank, a supply of water contained within the pan, said pan being designed to catch the water escaping from the tank through the openings therein, a pump for continuously transferring water from the pan to the interior of the tank at a rate such that the insulated wire advancing through the tank is completely immersed in the water, means for electrically isolating the electroconductive water, and means for continuously measuring the capacitance between the wire and the conductive water sheath surrounding successive portions of the wire.

5. Apparatus for monitoring the capacitance of an insulated wire having a central conductive core, which comprises a normally balanced impedance bridge for continuously comparing with a standard capacitance the capacitance between the conductive core and a conductive sheath of a liquid surrounding a predetermined length of the insulated wire, a source of alternating voltage for energizing the impedance bridge, said bridge giving a signal voltage of the same frequency as said source when unbalanced due to a difference betwen said capacitances, the phase of the signal voltage being in phase with said source when the bridge is unbalanced in one direction and being 180° out of phase when unbalanced in the reversed direction, an electron discharge device having an anode, cathode and control grids, means connecting said grids in a plurality of separate input circuits, means for impressing said signal voltage upon one of said input circuits, means for impressing the voltage of said source upon another of said input circuits, means for rectifying the A. C. component of the resulting plate current through the discharge device to obtain a unidirectional current which varies in magnitude with the direction and magnitude of the bridge unbalance, a control resistor through which the unidirectional output current of the rectifier is passed, and means for applying a D. C. bias voltage across the control resistor of such a value that the resultant voltage drop across said resistor is substantially zero when said capacitances are equal.

6. Apparatus for monitoring the capacitance of a continuously advancing insulated wire having a central conductive core, which comprises a normally balanced impedance bridge for continuously comparing with a standard capacitance the capacitance between the conductive core and a conductive sheath of liquid surrounding successive portions of the insulated wire of predetermined length, a source of alternating voltage for energizing the impedance bridge, said bridge giving a signal voltage of the same frequency as said source when unbalanced due to a difference between said capacitances, the phase of the signal voltage being in phase with said source when the bridge is unbalanced in one direction and being 180° out of phase when unbalanced in the reversed direction, an electron discharge device having an anode, cathode and control grids, means connecting said grids in a plurality of separate input circuits, means for impressing said signal voltage upon one of said input circuits, means for impressing the voltage of said source upon another of said input circuits, means for rectifying the A. C. component of the resulting plate current through the discharge device to obtain a unidirectional current which varies in magnitude with the direction and magnitude of the bridge unbalance, a control resistor through which the unidirectional output current of the rectifier is passed, means for applying a D. C. bias voltage across the control resistor of such a value that the resultant voltage drop across said resistor is substantially zero when said capacitances are equal, means for converting the voltage across the control resistor into an amplified A. C. voltage, and motor driven balancing means responsive to the magnitude and phase relationship of said last-mentioned voltage for restoring the balance of the impedance bridge.

7. Apparatus for controlling the capacitance of an insulated conductive core produced by continuously advancing a wire through an extruder wherein a layer of plastic insulation is applied to the core, which comprises a normally balanced impedance bridge for continuously comparing with a standard capacitance the capacitance between the conductive core and a conductive sheath surrounding a predetermined length of insulated wire, a first source of alternating voltage for energizing the impedance bridge, said bridge giving a signal voltage of the same frequency as said source when unbalanced due to a difference between said capacitances, the phase of the signal voltage being in phase with said source when the bridge is unbalanced in one direction and being 180° out of phase when unbalanced in the reversed direction, an electron discharge device having an anode, cathode and control grids, means connecting said grids in a plurality of separate input circuits, means for impressing said signal voltage upon one of said input circuits, means for impressing the voltage of said source upon another of said input circuits, means for rectifying the A. C. component of the resulting plate current through the discharge device to obtain a unidirectional current which varies in magnitude with the direction and magnitude of the bridge unbalance, a control resistor through which the unidirectional output current of the rectifier is passed, means for applying a D. C. bias voltage across the control resistor of such a value that the resultant voltage drop across said resistor is substantially zero when said capacitances are equal, means for converting the voltage across the control resistor into an amplified A. C. voltage which reverses in phase with a reversal in the direction of unbalance of the bridge, a balancing motor having windings spaced in quadrature relationship with each other, means for connecting one of said windings with said last-mentioned voltage to provide reversible energization of said winding, means connecting a second of said windings with a second source to provide a voltage for energizing said second windng, sad last-mentioned voltage having a phase relationship of 90° with respect to the voltage energizing the first winding so as to cause reversible operation of said motor upon reversible unbalance of the bridge, and means actuated by the balancing motor for restoring the balance of the impedance bridge.

References Cited in the file of this patent

UNITED STATES PATENTS

| | | |
|---|---|---|
| 1,984,166 | Walter | Dec. 21, 1934 |
| 2,051,781 | Brown | Aug. 18, 1936 |
| 2,156,895 | Godot | May 2, 1939 |
| 2,238,610 | Thomas | Apr. 15, 1941 |
| 2,476,496 | Kliever | July 19, 1949 |